No. 752,988. PATENTED FEB. 23, 1904.
R. A. LEIGH.
RUBBER LIKE MATERIAL.
APPLICATION FILED DEC. 8, 1903.
NO MODEL.
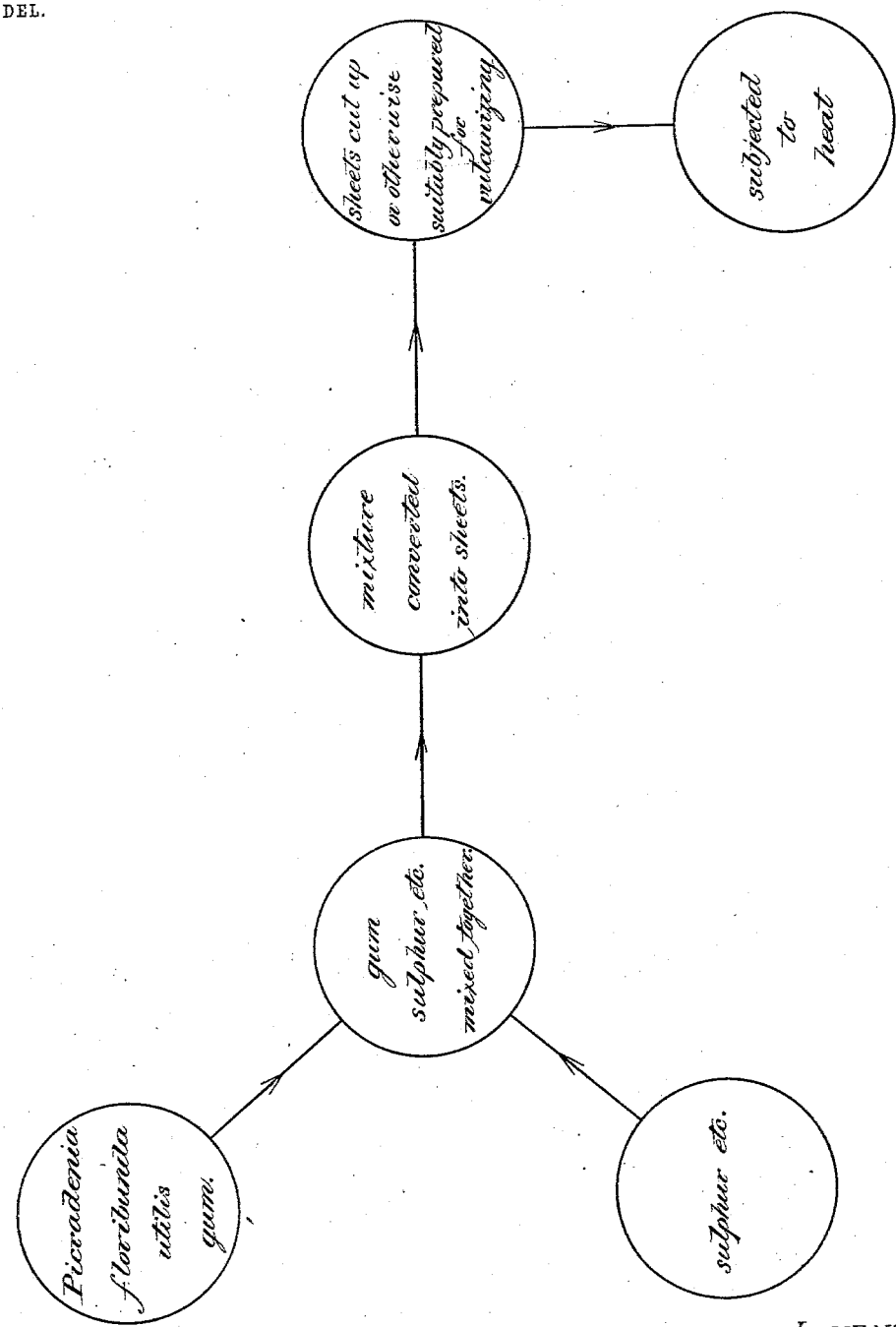
WITNESSES:
C. H. Walker,
J. W. Moore.
INVENTOR
Richard A. Leigh
BY
Bulkley & Durand
Attorneys No. 752,988. Patented February 23, 1904.

UNITED STATES PATENT OFFICE.

RICHARD A. LEIGH, OF DENVER, COLORADO, ASSIGNOR TO THE WESTERN RUBBER COMPANY, OF DENVER, COLORADO.

RUBBER-LIKE MATERIAL.

SPECIFICATION forming part of Letters Patent No. 752,988, dated February 23, 1904.

Application filed December 8, 1903. Serial No. 184,355. (No specimens.)

*To all whom it may concern:*

Be it known that I, RICHARD A. LEIGH, a citizen of the United States of America, residing in the city and county of Denver and State of Colorado, have invented certain new and useful Improvements in Rubber-Like Material; and I do declare the following to be a full, clear, and exact description of the invention, such as will enable others skilled in the art to which it appertains to make and use the same, reference being had to the accompanying drawing, which forms a part of this specification.

My invention consists of a new manufacture, the said manufacture being in the nature of a rubber-like material, either hard or soft, and adapted for use in various connections and for various purposes—as, for example, for many of the various purposes for which cured rubber is employed.

In producing my new manufacture or composition of matter I make use of an article of manufacture or composition of matter invented by Myron G. Brownell and described in an application for Letters Patent of the United States filed by the said Brownell on the 9th day of September and serially numbered 172,455. The new article of manufacture or composition of matter described in the said application consists of agglomerated gummy portions of the plant *Picradenia floribunda utilis*, commonly called since its discovery by the said Brownell the "Colorado rubber-plant," as it appears to have been first discovered and made use of in Colorado. The rubber-like gum, consisting of agglomerated gummy portions of the plant *Picradenia floribunda utilis*, as invented by the said Brownell and described in the said application, constitutes the basis of my invention and is the material or composition of matter which I employ in making my improved manufacture or composition of matter. The said rubber-like gum obtained by extracting and agglomerating the gummy portions of the plant *Picradenia floribunda utilis* is manufactured and sold for various purposes for which it may be found useful or appropriate, and I now propose to extend the use of this gum for particular manufacture by converting it into a material resembling cured rubber—that is to say, resembling either hard or soft rubber—as I find that my new manufacture or composition of matter may be employed for various purposes where soft cured rubber is ordinarily employed and also that it may be employed for various purposes where hard rubber or rubber vulcanite is ordinarily employed, and in some cases I find that my invention or new manufacture or composition of matter is much more satisfactory and gives better results than any other similar materials heretofore employed. The process by which I convert the said rubber-like gum consisting of agglomerated gummy portions of the plant *Picradenia floribunda utilis* and by which I produce my new article of manufacture or composition of matter is preferably as follows: The gum is vulcanized by mixing it with sulfur, chlorid of sulfur, or other sulfur compound and then subjecting it to heat in any suitable manner. The proportion of the parts employed, the degree of heat to which the gum is subjected, and the time required to complete the vulcanizing process may be greatly varied, according to the use to be made of the product. The amount of sulfur used depends upon the hardness of the required product. The harder the product the greater amount of sulfur is required. I have obtained good results by using ten per cent. of sulfur or one part of sulfur to ten parts of the gum. I have also found that by subjecting the gum mixed with the sulfur to a heat of 270° Fahrenheit for a period of thirty minutes good results are obtained.

In the practice of the process the gum after being mixed with the sulfur or sulfur compound is confined in molds of the required shape and size where articles of specific shape are to be formed or in suitable receptacles, or the gum after being mixed with the sulfur and formed into sheets of any desired thickness may be wound upon rolls, the convolutions being separated by layers of fibrous material. The molds may be confined between hollow plates or steam-jackets connected with a suitable source of steam, or the molds may be placed in a closed vessel to which steam is introduced and the sheets wound upon the rolls, as aforesaid, may be placed in a closed chamber and then subjected to the action of steam, or the heat may be applied in any manner known to the art or employed in the vulcanization of rubber.

Attention is called to the fact that in the vulcanizing process the mixture may be subjected to any desired pressure by the molds themselves or in the receptacles in which the substance is confined. For this purpose hydraulic or other pressure may be employed. These molds or receptacles are then placed in a suitable closed chamber or outer receptacle and steam introduced until the desired degree of heat is obtained.

Any desired coloring or other matter that may be desired may be added to the gum at the same time that the sulfur is mixed therewith and previous to the subjection of the mixture to heat and pressure for vulcanizing purposes.

The accompanying drawing graphically indicates the several steps of the process described.

Thus considered as a new manufacture or composition of matter it will be seen that my invention consists of the new material resulting from heating or otherwise properly treating a mixture of sulfur or sulfur compounds with agglomerated portions of the plant or shrub *Picradenia floribunda utilis.*

My invention contemplates the production of a rubber-like material, either hard or soft, by the use of agglomerated portions of the plant *Picradenia floribunda utilis* as a new ingredient, and the use of which rubber-like gum—to wit, the agglomerated portions of the plant *Picradenia floribunda utilis*—has, so far as I am now aware, never before been proposed and successfully carried out for the purpose herein described—that is to say, for the purpose of producing a manufacture or composition of matter capable of being used in a manner similar to ordinary cured or vulcanized rubber. In other words, I am the first to propose and demonstrate the practicability and value of treating agglomerated portions of the plant *Picradenia floribunda utilis* in the manner herein specified for the purpose of producing a useful manufacture or composition of matter.

The process of producing the rubber-like material by separating the gummy constituents of the plant *Picradenia floribunda utilis*, agglomerating them into a coherent mass, and vulcanizing said mass invented by me is not claimed in this particular application.

What I claim as my invention is—

1. As a new article of manufacture, the gummy constituents of the plant *Picradenia floribunda utilis*, agglomerated into a coherent mass and vulcanized.

2. The new manufacture or composition of matter resulting from heating agglomerated gummy portions of the plant *Picradenia floribunda utilis*, after mixing the same with sulfur or sulfur compounds.

3. The new manufacture or composition of matter resulting from heating under pressure a mixture of agglomerated gummy portions of the plant *Picradenia floribunda utilis* and sulfur or sulfur compounds.

4. The new manufacture or composition of matter resulting from heating a mixture of agglomerated gummy portions of the plant *Picradenia floribunda utilis* and sulfur or sulfur compounds and other matter.

5. The new manufacture or composition of matter resulting from heating under pressure a mixture of agglomerated gummy portions of the plant *Picradenia floribunda utilis*, sulfur and suitable coloring-matter.

6. The new manufacture or composition of matter resulting from the mixture of the gummy matter of the plant *Picradenia floribunda utilis* with one or more suitable ingredients, and the subsequent subjection of the mixture to heat.

In testimony whereof I affix my signature in presence of two witnesses.

RICHARD A. LEIGH.

Witnesses:
A. J. O'BRIEN,
DENA NELSON.